R. MARTINI.
MIRROR HOLDER.
APPLICATION FILED MAY 16, 1921.

1,395,855. Patented Nov. 1, 1921.

Inventor:
Rudolph Martini,
By Hugh K. Wagner,
Attorney.

UNITED STATES PATENT OFFICE.

RUDOLPH MARTINI, OF ST. LOUIS, MISSOURI, ASSIGNOR TO KAHN MIRROR PLATE COMPANY, OF ST. LOUIS, MISSOURI, A CORPORATION OF MISSOURI.

MIRROR-HOLDER.

1,395,855.

Specification of Letters Patent.   Patented Nov. 1, 1921.

Application filed May 16, 1921. Serial No. 470,216.

*To all whom it may concern:*

Be it known that I, RUDOLPH MARTINI, a citizen of the United States, residing at the city of St. Louis, in the State of Missouri, have invented certain new and useful Improvements in Mirror-Holders, of which the following is a specification.

This invention is a mirror back or frame, especially suitable for a hand mirror, though useful for other constructions also.

The especial objects of this invention are to provide a device of this kind that can be most cheaply manufactured and that will eliminate some of the items of cost now common and that will provide an efficient rest or cushion for the mirror.

Another feature of invention resides in the particular form of rivet used in this device.

Figure 1:
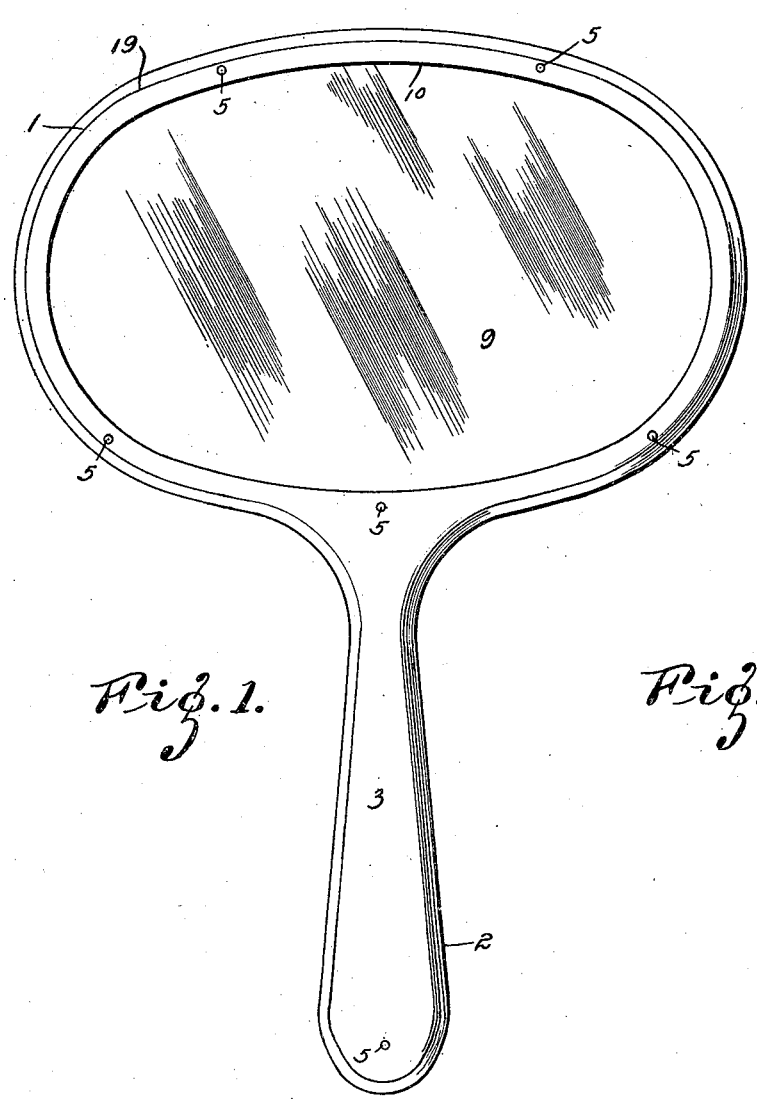
Figure 2:
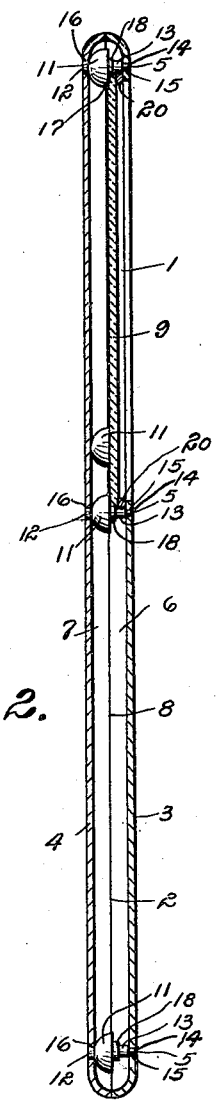

In the accompanying drawings forming part of this specification, in which like numbers of reference denote like parts wherever they occur, Figure 1 is a front elevation; and Fig. 2 is a vertical sectional view.

In appearance the main-body 1 and handle 2 of the frame resemble any similar mirror frame now in common use.

The same are, however, constructed of two opposite members 3 and 4 united together by rivets 5.

A flange 6 extends forward from the rear-member 4 and a flange 7 extends backward from the front-member 3, and the edges thereof meet in a joint at 8.

Opposite the mirror 9 the back 4 is solid (as shown at the upper part of Fig. 2), but an opening 10 is cut in the front-member 3, so as to allow the mirror 9 to be seen therethrough.

The rivets 5 are formed with heads 11, having projecting beyond the same a stud 12 and having projecting from the same in the opposite direction a step-down stud 13, the outer part 14 of which fits into a rivet hole 15 in the front-member 3, while stud 12 fits into a rivet hole 16 in back-member 4, in which holes the said studs 12 and 14 are respectively upset. Head 11 bears against the edges of hole 16 while the middle step of stud 13 bears against the edges of hole 15, forming a good clenching hold for the rivet in connection with members 3 and 4.

The edge of mirror 9 rests on ledge 17 of each of a plurality of rivets 5, and abuts steps 18 of the said rivets 5. The mirror 9 is thus held loosely but securely between ledge 17 and step 18 of rivets 5 and the front-rim 19 of body-member 3, a piece of ratan 20 or wire, or the like, being interposed around the edge of mirror 9 between the same and rim 19.

After being put together, as hereinbefore described, the frame can be plated or enameled or otherwise finished in any desired manner. If preferred such finishing may be performed before the insertion in place of the mirror 9.

An additional advantage of this mirror back or frame is its lightness, as nothing is interposed between mirror 9 and the back-member 4.

Having thus described this invention, I hereby reserve the benefit of all changes in form, arrangement, order, or use of parts, as it is evident that many minor changes may be made therein without departing from the spirit of this invention or the scope of the following claims.

I claim:

1. The combination of front and back members, each having a flange projecting toward the other and forming a joint and a plurality of rivets attaching the said members together, the said rivets each having an intermediate head and a stud on each side of the said head adapted to be upset to unite the said two members together.

2. The combination of front and back members, each having a flange projecting toward the other and forming a joint and a plurality of rivets attaching the said members together, the said rivets each having an intermediate head, a stud on each side of the said head adapted to be upset to unite the said two members together, there being a ledge on one side of the said head and a mirror resting upon the said ledge.

3. The combination of front and back members, each having a flange projecting toward the other and forming a joint and a plurality of rivets attaching the said members together, the said rivets each having an intermediate head, a stud on each side of the said head adapted to be upset to unite the said two members together, there being a ledge on one side of the said head, a mirror resting upon the said ledge, a cushion encircling the edge of the said mirror and lying between the same and the said front-member.

4. In a device of the character described the combination of a rear-member forming a solid back, a front-member having a cut-away part and there being a rim on the said front-member encircling the said cut-away part, a mirror between the said members and exposed to view through the said cut-away part, a retaining ring between the said mirror and the said rim, and a plurality of rivets uniting the said two members together, each of the said rivets having a rest for the said mirror.

5. In a device of the character described the combination of a rear-member forming a solid back, a front-member having a cut-away part and there being a rim on the said front-member encircling the said cut-away part, a mirror between the said members and exposed to view through the said cut-away part, a retaining ring between the said mirror and the said rim, a plurality of rivets uniting the said two members together, each of the said rivets having a rest for the said mirror, and a pair of studs adapted to be upset for uniting the said two members together.

6. In a device of the character described the combination of a rear-member forming a solid back, a front-member having a cut-away part and there being a rim on the said front-member encircling the said cut-away part, a mirror between the said members and exposed to view through the said cut-away part, a retaining ring between the said mirror and the said rim, a plurality of rivets uniting the said two members together, each of the said rivets having a rest for the said mirror, a pair of studs adapted to be upset for uniting the said two members together, and parts of each of the said rivets being adapted to cover and brace the holes over which the said studs are upset.

7. In a device of the character described the combination of a rear-member forming a solid back, a front-member having a cut-away part and there being a rim on the said front-member encircling the said cut-away part, a mirror between the said members and exposed to view through the said cut-away part, a retaining ring between the said mirror and the said rim, a plurality of rivets uniting the said two members together, each of the said rivets having a rest for the said mirror, a pair of studs adapted to be upset for uniting the said two members together, parts of each of the said rivets being adapted to cover and brace the holes over which the said studs are upset, the stud on one side of the said head being a step-down stud and the said mirror impinging against one of the steps of the said stud on each of the said rivets.

In testimony whereof I hereunto affix my signature.

RUDOLPH MARTINI.